Oct. 18, 1938.  J. TJAARDA  2,133,597
WHEEL
Original Filed Oct. 3, 1935   2 Sheets-Sheet 1

INVENTOR.
John Tjaarda
BY
Dike, Calver & Gray
ATTORNEY.

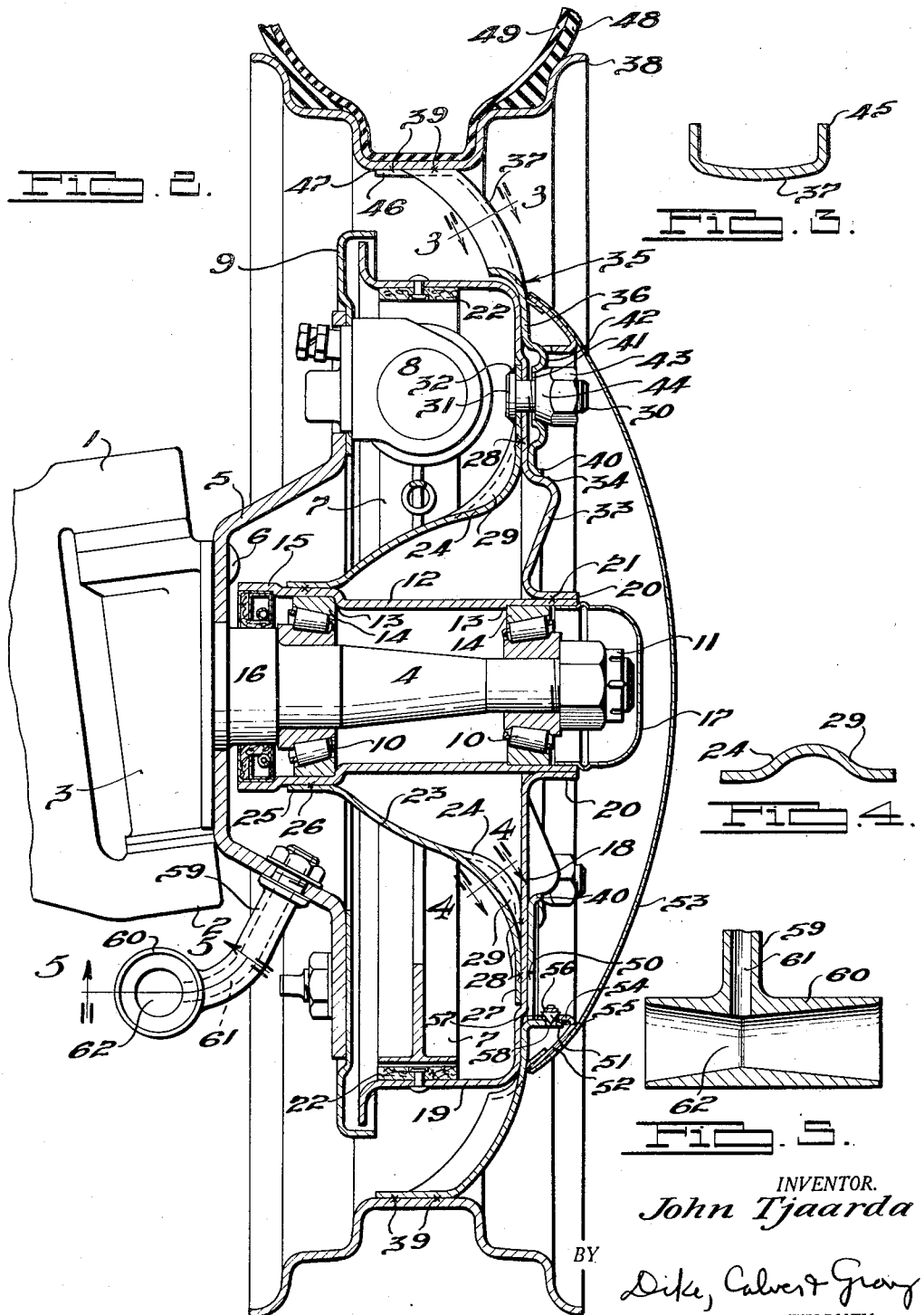

Patented Oct. 18, 1938

2,133,597

UNITED STATES PATENT OFFICE 2,133,597

WHEEL

John Tjaarda, Birmingham, Mich., assignor to Briggs Manufacturing Company, Detroit, Mich., a corporation of Michigan Application October 3, 1935, Serial No. 43,317
Renewed March 9, 1938

6 Claims. (Cl. 301—6)

This invention relates to vehicle wheel assemblies and is particularly, though not exclusively, adapted for utilization in connection with the wheels of automobiles.

A conventional type of wheel assembly consists of a malleable iron or forged hub rotatably mounted on the wheel spindle by means of anti-friction bearings. A brake drum composed in whole or in part of pressed steel and the wheel proper carrying the tire are fastened to a circular flange on the hub, the drum being permanently fastened and the wheel being demountable. The chief disadvantages of this construction are that the hub is heavy and expensive, and that the flat portion of the brake drum extending out from the hub flange to the cylindrical brake drum proper is large and must be made of heavy metal to have the requisite strength and rigidity.

The main object of the present invention is to overcome these disadvantages by providing a pressed or drawn steel hub and brake drum, which is lighter, stronger, and more rigid than the conventional structure and is also cheaper. Another object of the invention is to reduce the weight of the demountable portion of the wheel assembly and to increase its rigidity by providing a larger diameter bolting circle, which increases the size of the opening in the center and reduces the distance from the bolting circle to the rim.

These and other advantages of the invention will be more clearly understood from the following description and the accompanying drawings, in which:

Fig. 2 is a section through the axis of the wheel on the line 1—1 in Fig. 1.

Fig. 3 is a section through a spoke on the lines 3—3 in Figs. 1 and 2.

Fig. 4 is a section through a portion of the wheel hub on the line 4—4 in Fig. 2.

Fig. 5 is a section through the venturi on the line 5—5 of Fig. 2.

Figure 1:
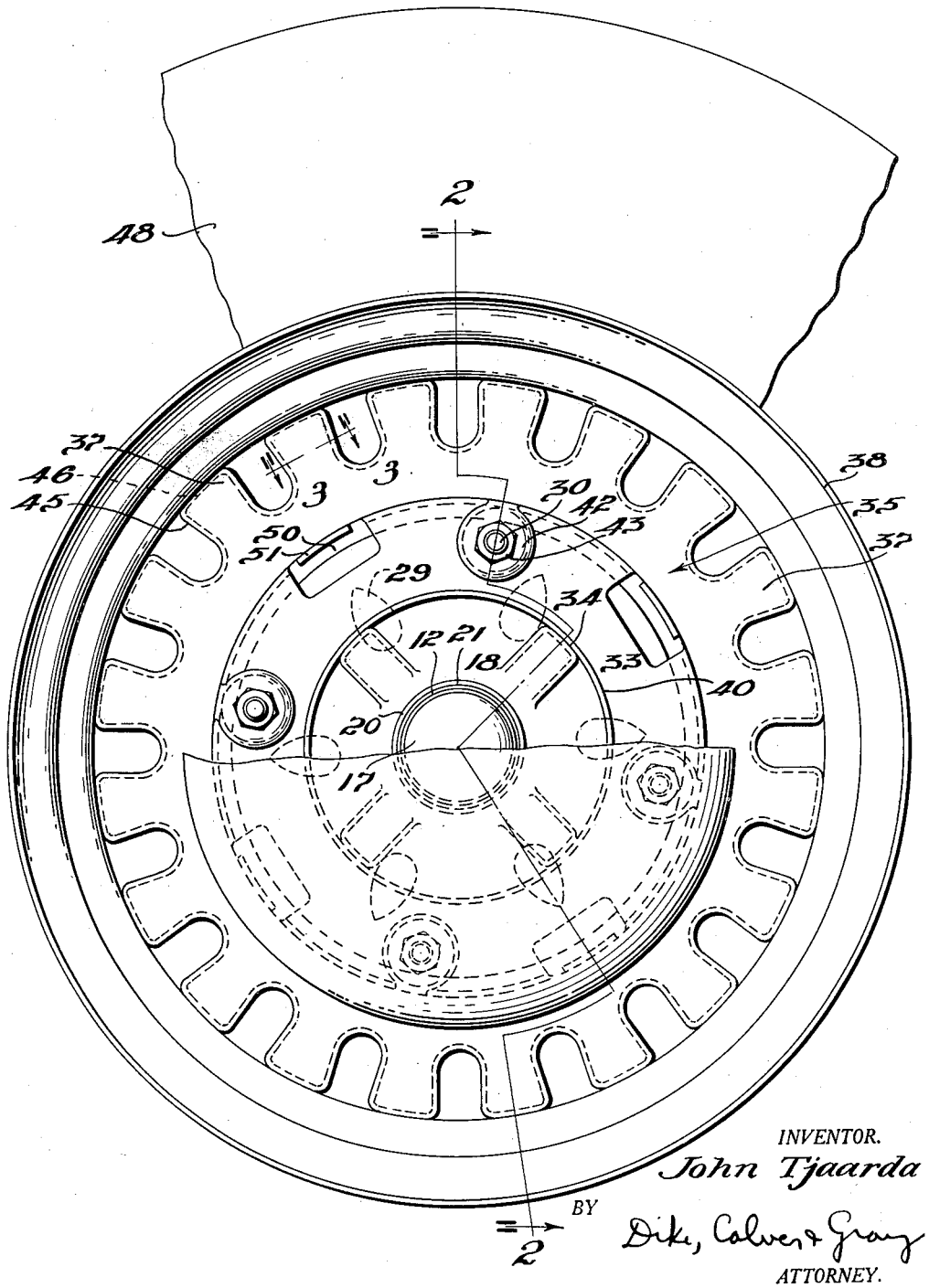
Fig. 1 is a view of the outer face of the wheel assembly, part of the large outer hub cap being broken away to show the parts covered thereby.

Before explaining in detail the present invention is to be understood that the invention is not limited in its application to the details of construction and arrangement of the parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the embodiment of the invention illustrated in the accompanying drawings, the end 1 of the front axle or the knuckle arm 1 has pivoted thereto by means of a king pin 2, a unitary knuckle 3 and wheel spindle 4. A brake backing plate 5 is secured to the knuckle 3 by rivets 6 and carries conventional brake shoes 7, brake actuating mechanism 8, and splash guard 9. Rotatably mounted on the spindle 4 by means of a conventional pair of anti-friction bearings 10 secured in place by the castellated nut 11 is the wheel assembly consisting of three main parts, namely, the central part of the wheel including the hub proper and the brake drum, the demountable portion of the wheel which carries the tire, and the cover for the hub and mounting bolts, which three main parts will be referred to, for lack of more precise terms, as the hub and brake drum assembly, the demountable wheel, and the outer hub cap respectively.

The hub and brake drum assembly comprises a tubular hub proper 12 having a pair of outwardly facing interior annular shoulders 13 against which are seated the outer races 14 of the anti-friction bearings 10, the outer races being pressed into the ends of the hub 12. The extreme inner end of the hub 12 carries a conventional grease retainer 15 which bears against a cylindrical surface 16 on the wheel spindle and seals that end of the hub against the escape of grease and the entrance of dirt or water. The other end of the hub 12 is sealed by a removable hub cap 17. The disc 18 of the pressed steel brake drum 19 has a central aperture surrounded by a cylindrical flange 20 which fits over and is welded at 21 to the outer end of the hub 12. The brake lining 22 is riveted to the brake drum 19 in a position to be engaged by the brake shoes 7. A pressed steel bell-shaped bracing member 23 has an approximately conical body 24 terminating at its small end in a cylindrical sleeve 25 which fits over and is welded at 26 to the inner end of the hub 12. The large end of the bracing member 23 flares out into a flat flange 27 which fits against and is welded at 28 to the inner face of the brake drum disc 18. The place in the bracing member 23 where the conical body 24 merges into the flange 27 is strengthened by six embossed radial ribs 29, one of which is shown in section in Fig. 4, extending from points on the conical body 24 to points on the flange 27. Four wheel mounting bolts 30 are spaced equally around the mounting bolt circle, that is, the annular zone where the flange 27 of the bracing member 23 is in contact with and is welded to the inner face of the brake drum disc 18. The bolts extend through both the flange 27 and the disc 18 and have their heads lightly welded at 32 to the flange 27. Four elongated radially extending bosses 33 are spaced around the flange 27 on the outer face of the brake drum disc 18. These bosses strengthen the otherwise flat area of the brake drum disc 18 and their steep outer ends 34 help to position and support the demountable wheel 35.

The demountable wheel 35 comprises a disc-like member 36 with a periphery formed into spokes 37 and a rim 38 welded at 39 onto the ends of the spokes. There is a large central aperture in the disc-like member 36 surrounded by a flange 40, the aperture being of such a size that it will just fit over the four bosses 33 with the flange 40 bearing on the steep outer ends 34 of these bosses. Four bolt holes 41 are spaced around the disc-like member 36 to loosely receive the bolts 30. These bolt holes are each surrounded by an embossed bead 42, the inside of the beads forming the edge of the holes so that when the nuts 43 are screwed onto the bolts 30, the rounded tapered ends 44 on the nuts will be wedged into the holes. The beads 42 are so shaped that the inner part of the bead is spaced from brake drum disc 19 allowing a slight springiness which keeps the nuts 43 tight. The outer part of the disc-like member 36 is formed into a large number of curved spokes 37 which are channel shaped in cross section, as shown is Fig. 3, the metal from between the spokes having been pressed down to form the flanges 45. The spokes terminate in portions 46 which lie against and are welded at 39 to the cylindrical inner surface 47 of the rim 38, which is of the conventional drop center type and which carries the tire casing 48 and tube 49.

Struck out from openings 50 in the face of the disc-like member 36 are four lugs 51 which lie on a circle enclosing the bolt holes and which project out parallel to the axis of the wheel. The lugs 51 carry the outer hub cap, comprising a circular frame or ring 52 carrying a convex disc-like member 53. The ring 52 has a cylindrical sleeve 54 which slips inside of the four lugs 51 and carries conical buttons 55 on the ends of leaf springs 56, the buttons projecting through holes 57 in the flange into holes 58 in the lug 51 to hold the hub cap in place.

Secured in a hole in the brake backing plate 5, is an arm 59 which projects down below the king pin 2 and which carries at its end a venturi 60 pointing in the direction in which the car normally travels. A passage 61 in the arm connects the neck of the venturi with the interior of the chamber formed by the brake backing plate 5, the hub and brake drum assembly, and the splash guard. The current of air caused to flow through the venturi by the movement of the car sucks air out of the aforementioned chamber. This air is replenished by a current of air flowing in between the splash guard and the flange on the edge of the brake drum which cools the brake drum as well as the brake shoes and associated parts.

The advantages of the foregoing constructions are that it achieves the objects and advantages set out above. The mounting bolt circle is large, which allows the weight of the wheel to be reduced because the distance from the bolts to the rim is small. It also reduces the width of the flat annular part of the brake drum between the mounting bolt circle and the cylindrical part of the drum, which allows the brake drum to be made of thinner metal. The annular mounting bolt zone is very rigidly supported on the hub since the brake drum disc 18, the bracing member 23, and the hub 12 are welded into a hollow ring of triangular cross section with the mounting bolt zone carried at one corner of the triangle.

Since the brake shoes are cooled, the brake lining can be put on the drum, as shown, instead of on the shoes, which has several advantages. The brake lining acts as a sound deadening material, and its damping effect stops any high frequency vibration of the brake drum. This allows the use of thinner stock, and it prevents squeaks, just as the dampers in a piano stop the vibration of the strings which they touch and thus silence them. A full circle of brake lining can be used instead of having only the faces of the shoes covered thereby, and the lining wears down evenly around the entire circle of the drum instead of the lining wearing out more rapidly at one end of a shoe than at the other. As a consequence the brakes are longer lived and require materially less servicing. If the brakes are not properly taken care of and are allowed to score, it is the shoes in the present design which are damaged instead of the drum, and replacing the damaged parts involves the purchasing of the small cheap shoes instead of the relatively expensive hub and brake drum assembly.

I claim:

1. A wheel assembly comprising an elongated hub, a sheet metal brake drum with a substantially flat wall secured to the outer end of the hub, a sheet metal bell shaped bracing member having its small end secured to the inner end of the hub and a flat flange at its large end resting against and secured to the flat wall of the brake drum, a plurality of bolts projecting through the flange on the bracing member and the flat wall of the brake drum, the bolts lying on a circle concentric with the hub, a plurality of elongated bosses on the outer face of the flat wall of the brake drum, the bosses radiating out from the hub and having steep outer ends lying on a circle of smaller diameter than the bolt circle, a wheel having a substantially flat central portion fitting against the flat wall of the brake drum, the wheel having a central aperture whose edge engages the steep outer shoulders of the bosses on the brake drum wall and having a plurality of holes through which the bolts project, and nuts on the bolts to secure the wheel in place.

2. A wheel assembly as defined in claim 1 in which the wheel has a rim whose median plane lies substantially to one side of the flat central portion of the wheel secured to the flat wall of the brake drum so that the median plane of the wheel is also the median plane of the braking surface.

3. A wheel assembly comprising an elongated hub, a brake drum secured to one end of the hub, a sheet metal bracing member having its small end secured to the opposite end of the hub and having a flange at its large end engaging and secured in flatwise relation to the brake drum at points spaced radially from the hub, a plurality of bolts projecting through said flange and brake drum, a plurality of radially disposed bosses on the outer face of the brake drum, a wheel whose central portion is provided with an opening adapted to telescope over said bosses to position the wheel upon said brake drum and having a plurality of holes through which the bolts project, and nuts on the bolts to secure the wheel in place.

4. A wheel assembly comprising an elongated hub, a brake drum secured to one end of the hub, a sheet metal bracing member having its small end secured to the opposite end of the hub and having a flange at its large end engaging and secured in flatwise relation to the brake drum at points spaced radially from the hub, a plurality of bolts projecting through said flange and brake drum, a plurality of radially disposed elongated wheel locating bosses on the outer face of the brake drum, a wheel whose central portion is provided with an opening adapted to telescope over said bosses to position the wheel upon said brake drum and having a plurality of holes through which the bolts project, and nuts on the bolts to secure the wheel in place.

5. A wheel assembly comprising an elongated hub, a brake drum provided with a braking surface and an upright face secured to one end of the hub, a sheet metal bracing member having its small end secured to the opposite end of the hub and having a flange at its large end engaging and secured in flatwise relation to the upright face of the brake drum at points spaced radially from the hub, a plurality of bolts projecting through said flange and brake drum face, a plurality of radially disposed bosses on the outer face of the brake drum, a wheel whose central portion is provided with an opening adapted to telescope over said bosses to position the wheel upon said brake drum and having a plurality of holes through which the bolts project, and nuts on the bolts to secure the wheel in place, said wheel having a rim whose median plane lies substantially to one side of the central portion of the wheel so that the median plane of said wheel is also the median plane of said braking surface.

6. A wheel assembly comprising an elongated hub, a pair of annular sheets extending outwardly from and secured to opposite ends of the hub, said sheets having flat portions secured together at points spaced radially from the hub, one thereof having an inward annular extension providing a braking surface and a plurality of radially disposed wheel locating embossments, a series of bolts extending through said flat sheet portions in a circle outlying said embossments, a wheel having a central portion provided with a concentric opening engaging and seated upon the outer edges of said embossments and having a series of holes to receive said bolts, said wheel having a rim whose median plane lies substantially to one side of the central portion thereof so that the median plane of said wheel is also the median plane of said braking surface, and nuts on said bolts to secure the wheel in place.

JOHN TJAARDA.